United States Patent [19]
Oda et al.

[11] Patent Number: 5,304,878
[45] Date of Patent: Apr. 19, 1994

[54] ELECTRONIC PARTS AND CONNECTOR MOUNTING STRUCTURE OF DISK UNIT

[75] Inventors: Kazuya Oda; Takeshi Sato, both of Fukushima; Kazuo Hasegawa, Kanagawa, all of Japan

[73] Assignee: Mitsubishi Denki Kabushiki Kaisha, Tokyo, Japan

[21] Appl. No.: 799,569

[22] Filed: Nov. 27, 1991

[30] Foreign Application Priority Data

Nov. 29, 1990 [JP] Japan ................................ 2-332233

[51] Int. Cl.$^5$ ...................... H02K 7/14; H02K 11/00; G11B 5/016
[52] U.S. Cl. .................................. 310/67 R; 310/71; 310/DIG. 6; 360/99.04
[58] Field of Search ............... 310/68 R, 71, 67 R, 310/268, DIG. 6, 91; 360/86, 98.07, 99.04, 99.08, 99.11

[56] References Cited

U.S. PATENT DOCUMENTS

| | | | |
|---|---|---|---|
| 3,849,800 | 11/1974 | Cuzner | 360/97 |
| 4,324,994 | 4/1982 | Hager | 310/68 R |
| 4,359,763 | 11/1982 | Hoffman | 360/99.04 |
| 4,385,333 | 5/1983 | Hasler | 360/98.07 |
| 4,665,453 | 5/1987 | Mikamoto et al. | 360/99.04 |
| 4,733,115 | 3/1988 | Barone et al. | 310/68 R |
| 4,763,211 | 8/1988 | Yamamoto et al. | 360/97 |
| 4,825,316 | 4/1989 | Kishi et al. | 360/97.02 |
| 4,841,393 | 6/1989 | MacLeod et al. | 360/98.07 |
| 4,855,849 | 8/1989 | Jones et al. | 360/97.07 |
| 5,023,498 | 6/1991 | Abe | 310/71 |
| 5,038,240 | 8/1991 | Isomura | 360/99.08 |

FOREIGN PATENT DOCUMENTS

| | | | |
|---|---|---|---|
| 0427490 | of 1991 | European Pat. Off. | |
| 0208668 | 12/1982 | Japan | 360/99.08 |
| 0113568 | 6/1984 | Japan | |
| 0194655 | 11/1984 | Japan | 310/268 |
| 0217271 | 12/1984 | Japan | |
| 0022269 | 1/1987 | Japan | 360/99.08 |
| 0046583 | 2/1990 | Japan | |
| 2-46151 | 4/1990 | Japan | |
| WO87/03347 | 6/1987 | PCT Int'l Appl. | |
| WO89/08313 | of 1989 | PCT Int'l Appl. | |

OTHER PUBLICATIONS

Der Elektronisch Kommutierte Aussenlaufermotor: ein idealer Antrieb fur hohe Anspruche, Dietrich Homburg, Apr. 1987, pp. 65–70, Antriebstechnik.

Primary Examiner—Kristine L. Peckman
Assistant Examiner—C. LaBalle
Attorney, Agent, or Firm—Wolf, Greenfield & Sacks

[57] ABSTRACT

To provide a disk unit with a reduced thickness, a motor substrate for mounting an inner rotor, outer rotor or belt drive type motor for rotating a magnetic recording medium, includes an extension portion which extends beyond the magnetic recording medium, to which electronic parts and a connector are mounted, so that they do not interfere with the magnetic recording medium.

6 Claims, 7 Drawing Sheets

ELECTRONIC PARTS AND CONNECTOR MOUNTING STRUCTURE OF DISK UNIT

BACKGROUND OF THE INVENTION

1. Field of the Invention

The present invention relates to the electronic parts and connector mounting structure of a flexible disk unit having a reduced thickness.

2. Description of the Prior Art

FIG. 5 is a diagram showing the positional relationship of the spindle motor, carriage assembly and stepping motor of a flexible disk unit of the prior art. FIG. 6 is a sectional view showing the positional relationship between the spindle motor and the carriage of the flexible disk unit. FIG. 7 is a diagram showing the whole configuration of the flexible disk unit. In these figures, reference numeral 1 represents a spindle motor for rotating a magnetic recording medium (unshown) which is a flexible disk, 1a driving magnet, 1b stator, 1c coil, 1d spindle motor substrate, 1e chucking hub, 1f rotation axis, 1h IC, 1j connector, 1n magnetic case, 2 frame, 3 carriage assembly, 3a carriage for mounting a magnetic head 3c, 3b arm for mounting a magnetic head 3d, 4 stepping motor which seeks and positions the carriage assembly 3 in the radial direction of the medium, 4a lead screw directly connected to the rotation axis of the stepping motor 4, 6 slide cam, 7 cartridge holder, 8 lever, 9 substrate, 10 shield cover, and 11 front panel.

The operation of the flexible disk unit will be described next. In FIG. 7, when the magnetic recording medium (unshown) is inserted into the unit, the medium is loaded onto the read-write position by a loading mechanism consisting of the slide cam 6, the cartridge holder 7 and the lever 8. The detailed explanation of the loading mechanism is omitted here. When the medium is placed in the loading position, the hub of the medium is chucked by the chuking hub 1e of the spindle motor 1 fixed to the frame 2, and the medium rotates by the rotation of the spindle motor.

A projection (unshown) provided on the carriage assembly 3 is engaged with a groove in the lead screw 4a directly connected to the axis of the stepping motor 4 so that the rotary motion of the stepping motor is changed into the motion in the radial direction of the medium of the carriage assembly 3. Therefore, the magnetic heads 3c and 3d mounted on the carriage assembly 3 can move in the radial direction of the magnetic recording medium by means of the stepping motor 4, and are positioned above the target truck. The flexible disk unit of the prior art is configured as shown in FIG. 5 and FIG. 6. That is, an outer rotor type spindle motor wherein the driving magnet 1a is located outside the stator 1b and the coil 1c is used, and the carriage assembly 3 is located above the stator 1b, the coil 1c and the driving magnet 1a as shown in FIG. 6.

The rotation axis 1f is projected from the top of the spindle motor substrate 1d described above, and the chucking hub 1e which functions as a chucking member is rotated by this rotation axis 1f so that the flexible disk which functions as a magnetic recording medium is set on the chucking hub 1e and is rotated. Electronic parts such as the IC 1h and the connector 1j for connecting the substrate 9 of the main assembly are mounted on the rear of the spindle motor substrate 1d. In this case, the height (thickness) of the unit is determined by the total of the thicknesses of the carriage 3 and the substrate 1d of the spindle motor 1 and that of the tallest one of the driving magnet case 1n, the IC 1h mounted on the substrate 1d (the opposite side of the carriage assembly 3) and the connector 1j, and clearances between them.

Since the flexible disk unit of the prior art is configured as described above, the carriage 3 must be made thin to reduce the thickness of the flexible disk unit. However, the magnetic heads 3c and 3d can be made thin to a certain degree in connection with the unshown medium. Furthermore, there is a limit to a reduction in the thicknesses of the driving magnet 1a, the coil 1c and the case 1n of the spindle motor 1 in order to maintain performance. Similarly, the thickness of the IC 1h and the connector 1j on the motor substrate 1d cannot be reduced. Thus it is difficult to reduce the thickness of the disk unit of the prior art.

SUMMARY OF THE INVENTION

In view of the above problem of the prior art, it is an object of the present invention to achieve the electronic parts and connector mounting structure of a disk unit having a reduced thickness.

The disk unit having an electronic parts and connector mounting structure according to the present invention comprises the motor substrate for mounting an inner rotor, outer rotor or belt drive type motor, the rotation axis rotated and driven by the motor described above, a chucking member (chucking hub) which is rotated by the rotation axis and the magnetic recording medium is mounted on, the carriage guided in the radial direction of the chucked magnetic recording medium and having the heads, electronic parts such as the IC for controlling the above motor, and the connector for connecting the wire of the above motor substrate to the wire of another substrate. In the disk unit, an extension portion is provided on the motor substrate described in the foregoing, and the electronic parts and the connector described above are disposed on the extension portion on the side of the carriage so that they do not interfere the magnetic recording medium described previously.

Since the IC and the connector are disposed on top of the motor substrate on the side of the carriage, the heights of the IC and the connector are below the height of the carriage, thus making it possible to reduce the thickness of the disk unit.

The above and other objects, features, and advantages of the invention will become more apparent from the following description when taken in conjunction with the accompanying drawings.

DESCRIPTION OF THE PREFERRED EMBODIMENT

Figure 1:
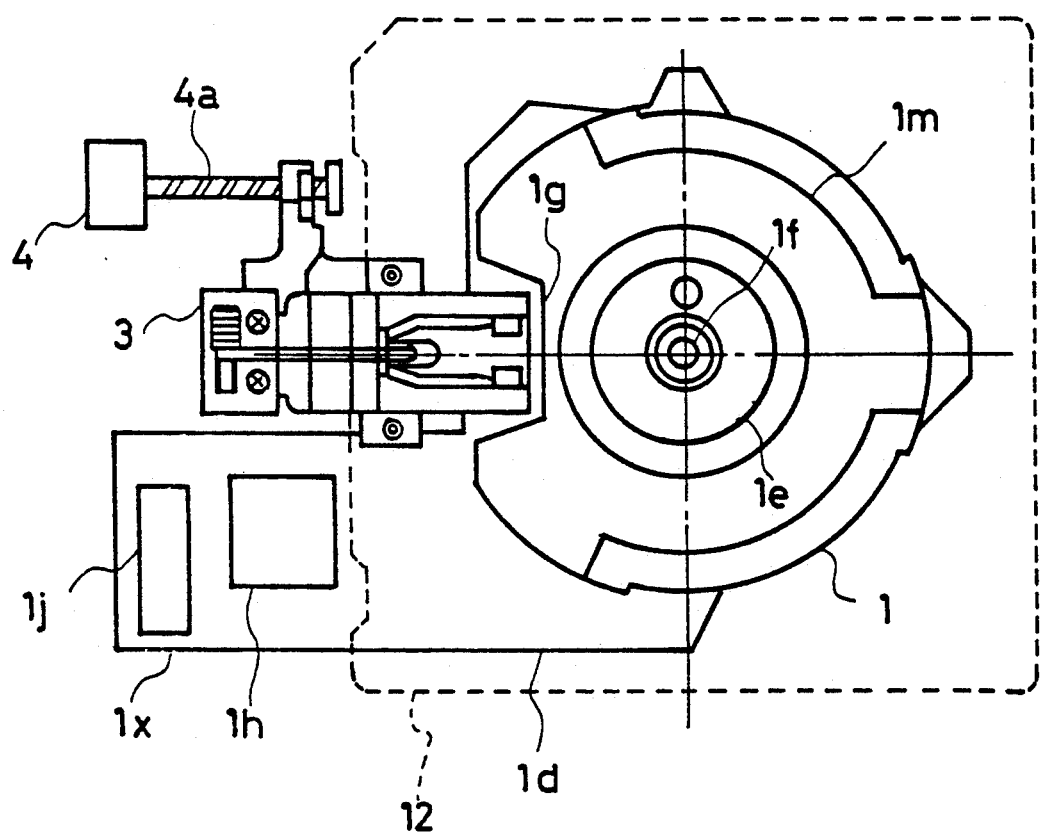
FIGS. 1 to 4 are plan, side and exploded perspective views of the electronic parts and connector mounting structure of a disk unit according to an embodiment of the present invention.
Figure 2:
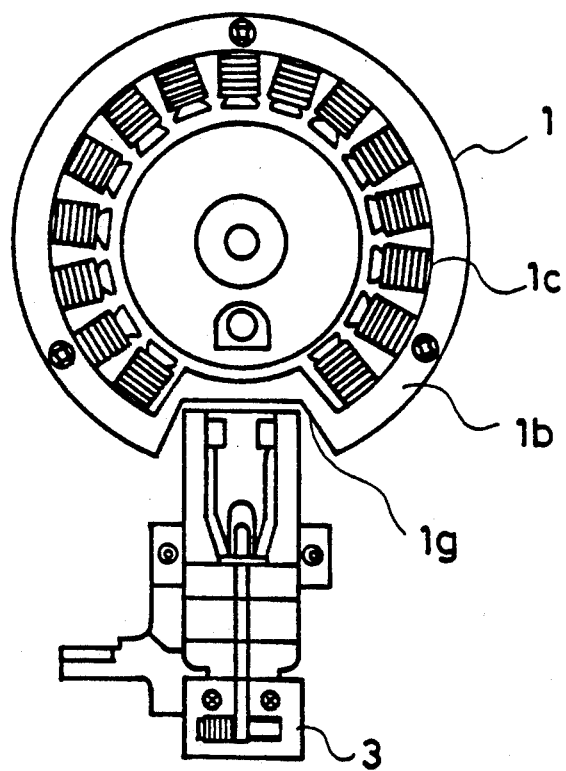
Figure 3:
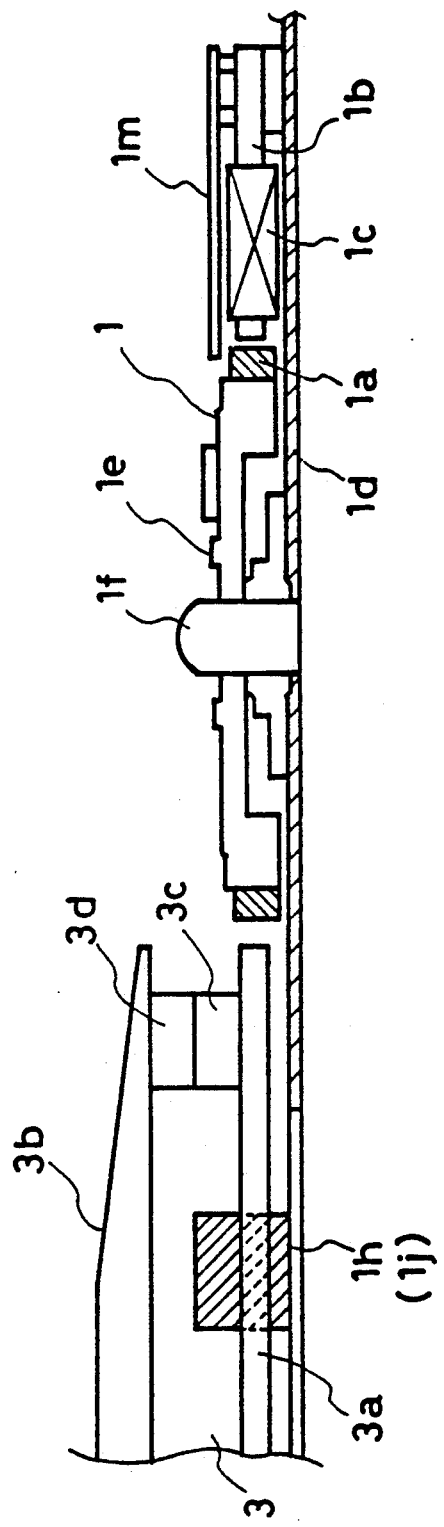
Figure 4:
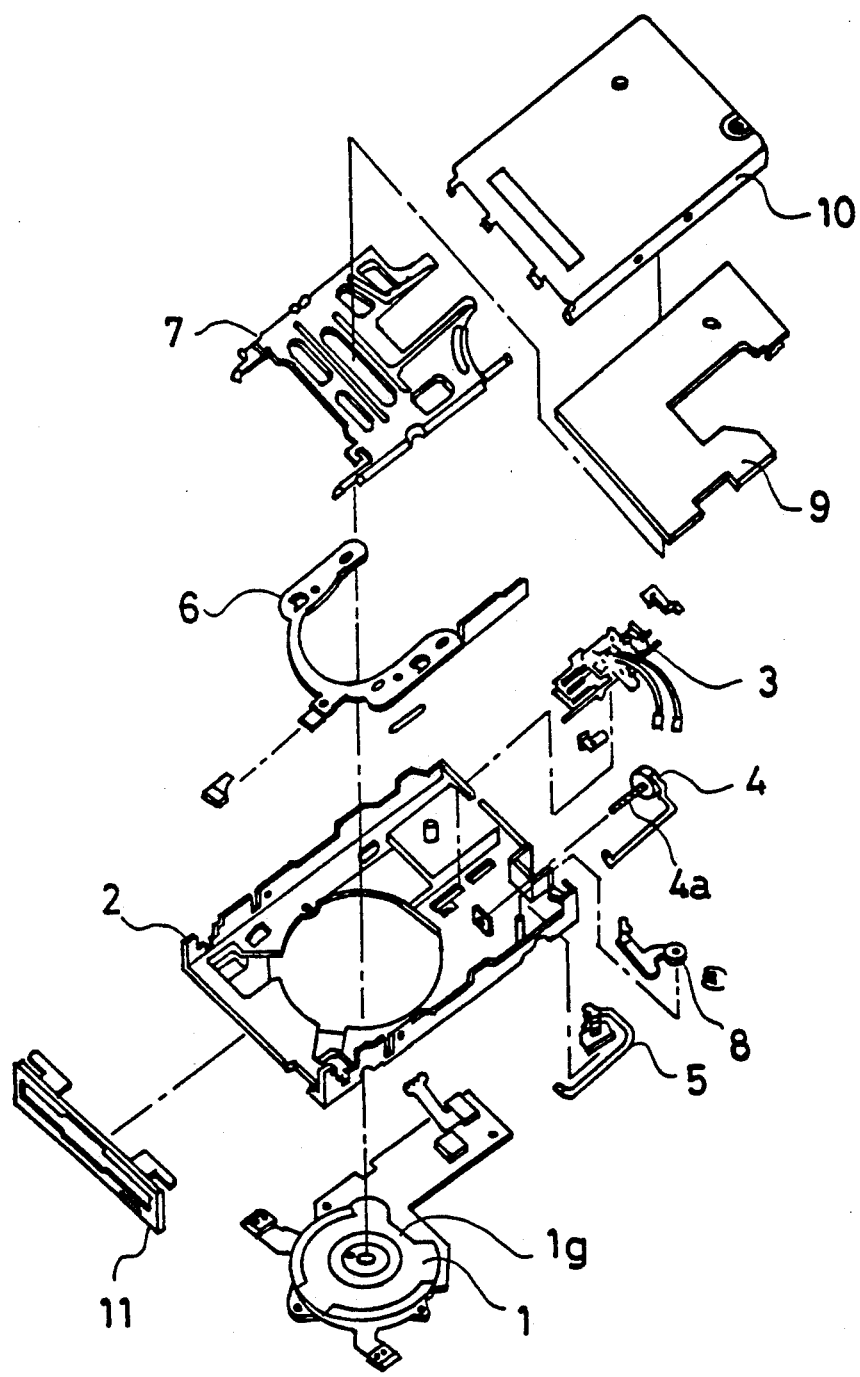
Figure 5:
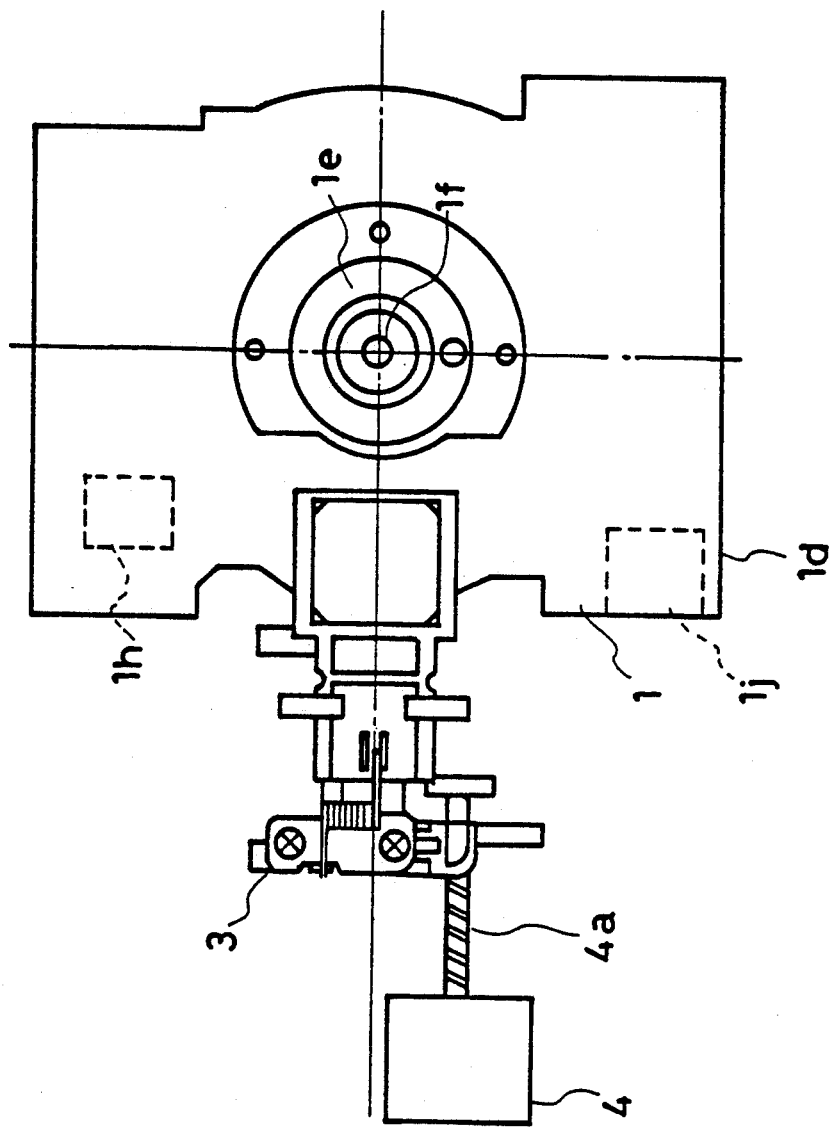
FIGS. 5 to 7 are plan, side and exploded perspective views of a flexible disk unit of the prior art.
Figure 6:
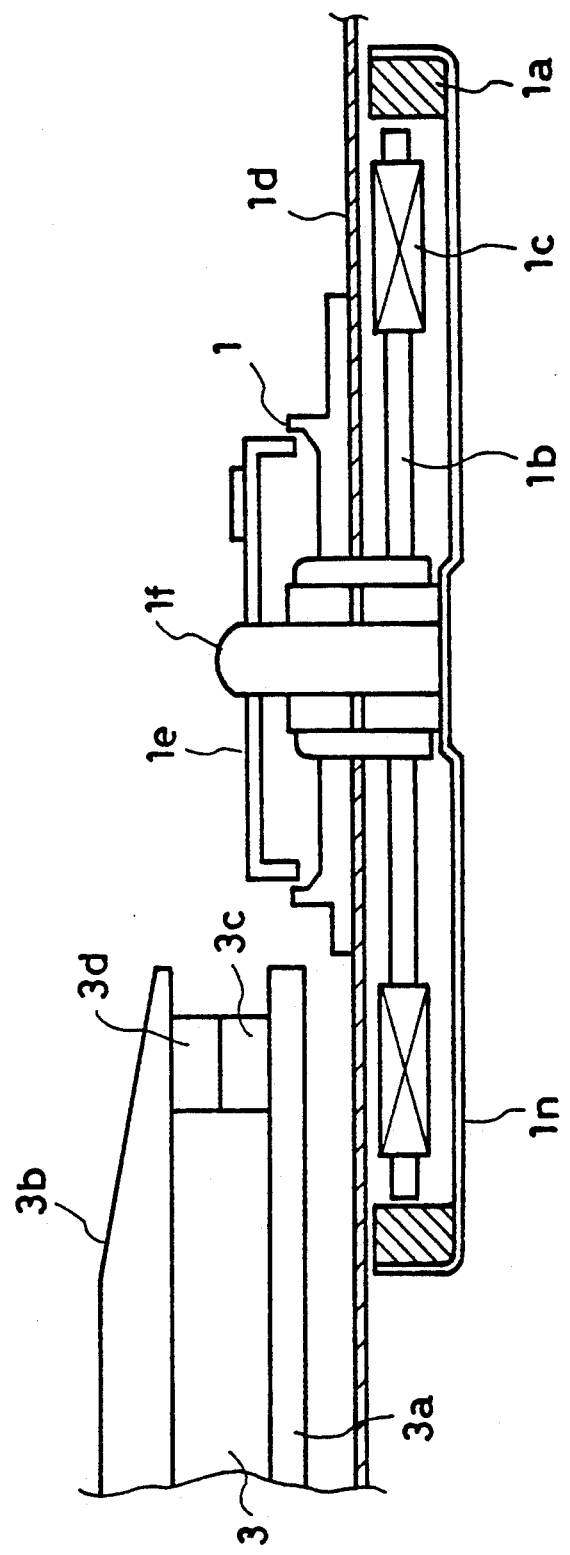
Figure 7:
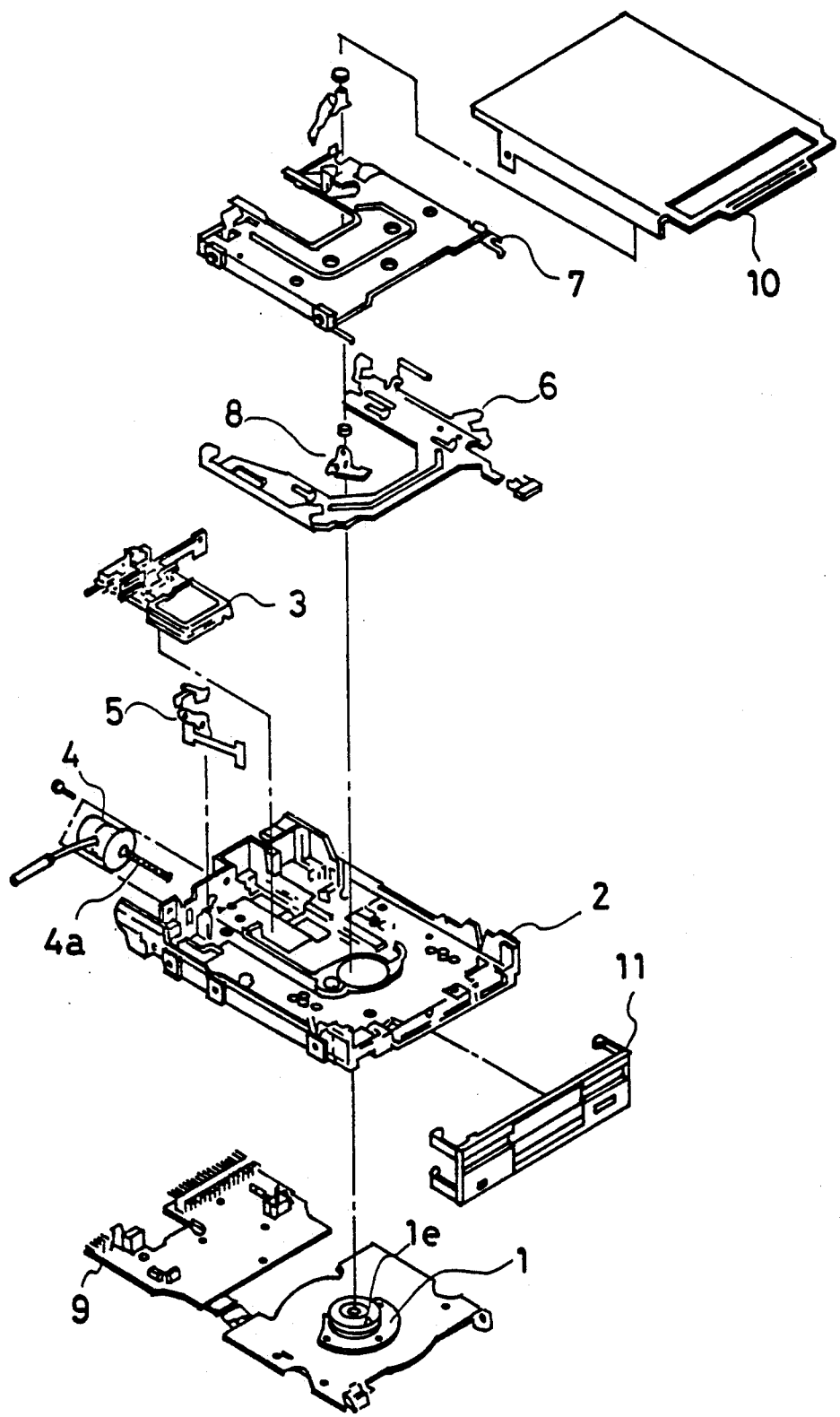

Referring to the accompanying drawings, an embodiment of the present invention will be described. FIGS. 1 to 4 are diagrams illustrating the embodiment. FIG. 1 is a diagram showing the positional relationship of the spindle motor, carriage, stepping motor and magnetic recording medium. FIG. 2 is also a diagram showing the positional relationship of the stator, coil and carriage. FIG. 3 is a sectional view showing the positional relationship between the spindle motor and the carriage. FIG. 4 is a diagram illustrating the whole configuration of the disk unit. In these figures, reference numeral 1 represents a spindle motor which rotates a magnetic recording medium 12 and consists of a rotor, 1a driving magnet disposed on the outside periphery of the rotor, 1b ring-shaped stator, 1c coil disposed on the inside periphery of the stator 1b, 1d spindle motor substrate, 1e chucking hub, 1f rotation axis, 1g recess formed by denting (recessing) a part of the outside periphery of the stator 1b towards the inside thereof and free from the coil 1c, which is the feature of the present invention, 1h IC for the spindle motor 1, 1j connector for connecting a substrate 9, 2 frame, 3 carriage assembly, 3a carriage for mounting a magnetic head 3c, 3b arm for mounting a magnetic head 3d, 4 stepping motor for moving the carriage assembly 3 in the radial direction of the medium and positioning the assembly, 4a lead screw directly connected to the rotation axis of the stepping motor 4, 5 sensor, 6 slide cam, 7 cartridge holder, 8 lever, 9 substrate, 10 shield cover and 11 front panel. On the motor substrate 1d, an extension portion 1x extending from the spindle motor 1 to the one side of the carriage 3 is provided so that electronic parts such as the IC 1h and the connector 1j are mounted on the above side (carriage 3) of the extension portion 1x.

The operation of the disk unit will be described next. In FIG. 4, when the magnetic recording medium (unshown) is inserted into the unit, the medium is loaded onto the read-write position by a loading mechanism which consists of the slide cam 6, the cartridge holder 7 and the lever 8. The detailed explanation of the loading mechanism is omitted here. When the medium is placed in the loading position, the hub of the medium is chucked by the chucking hub 1e of the spindle motor 1 fixed to the frame 2, and is rotated by the rotation of the spindle motor.

A projection (unshown) disposed on the carriage 3 is engaged with a groove in the lead screw 4a directly connected to the axis of the stepping motor 4 so that the rotary motion of the stepping motor 4 is changed into the motion in the radial direction of the medium of the carriage 3. Therefore, the magnetic heads 3c and 3d mounted on the carriage 3 can move in the radial direction of the magnetic recording medium and is positioned above the target truck by means of the stepping motor 4.

The disk unit according to the present invention is configured as shown in FIG. 1, FIG. 2 and FIG. 3. That is, an inner rotor type spindle motor wherein the driving magnet 1a is located inside the stator 1b and the coil 1c is used, and a recess 1g free from the coil 1c is formed by denting a part of the outside periphery of the stator 1b toward the inside thereof. When the carriage 3 is positioned on the side of the inside periphery, it goes into the recess 1g and is located on the same plane with the stator 1b, the coil 1c and the driving magnet 1a.

In FIG. 1, the parts mounted on the spindle motor substrate 1d, that is the IC 1h and the connector 1j, are on the same plane on top of the extension portion 1x which is out of the position where the medium 12 is loaded.

Therefore, the heights of the IC 1h and the connector 1j are below that of the carriage 3a. The height (thickness) of the unit is determined by the total of the thicknesses of the carriage 3 and the substrate 1d of the spindle motor 1 and a clearance between them as in FIG. 3.

As described in the foregoing, according to this embodiment, the IC and the connector mounted on the motor substrate are located on the same plane as the carriage 3, and furthermore the medium is loaded in such a way that it is not overlapped with the IC and the connector on the spindle motor substrate. Therefore, it is possible to reduce the thickness of the unit and to achieve an inexpensive disk unit without deteriorating strength by making an unshown hole in the frame for escaping parts or without making a level difference in the frame for escaping parts.

It is possible to connect the spindle motor substrate and the substrate of the main assembly at a short distance and at a low cost since the the spindle motor substrate is extended to a great extent.

As shown in FIG. 1, in the above embodiment, an inner rotor type spindle motor having the recess 1g described above is used to explain that the IC 1h and the connector 1j, the parts on the substrate 1d of the spindle motor 1, are loaded in such a way that they do not interfere the magnetic recording medium 12 in the plane direction. An inner rotor, outer rotor or belt drive type spindle motor can achieve the same effects as the present invention described above.

An opening may be formed in a part of the stator 1b as the recess 1g.

As described in the foregoing, according to the present invention, in a flexible disk unit comprising a motor substrate for mounting an inner rotor, outer rotor or belt drive type motor, a rotation axis rotated and driven by the motor, a chucking hub which is rotated by the rotation axis and a magnetic recording medium is mounted on, a carriage mechanism guided in the radial direction of the chucked magnetic recording medium and having a head, electronic parts such as an IC for controlling the motor, and a connector for connecting the wire of the motor substrate to the wire of another substrate, an extension portion is provided on the motor substrate, and the electronic parts and the connector are located on the carriage mechanism side of the extension portion so that they do not interfere the magnetic recording medium. As a result, the disk unit can be made thinner than the disk unit of the prior art wherein electronic parts and a connector are mounted on the rear of the motor substrate.

What is claimed is:

1. In a disk unit including a motor having a rotor and stator, the motor for rotating a magnetic recording medium disposed to one side of the rotor and stator, a head carriage guided in a radial direction relative to the magnetic recording medium, and at least one electronic part, a mounting structure comprising:
   a motor substrate mechanically supporting the rotor and stator and the electronic part, the motor substrate further electrically interconnecting the electronic parts, and the motor substrate including an extension portion extending beyond the magnetic recording medium and containing the electronic part.

2. The mounting structure according to claim 1, wherein
   said motor is a spindle motor including said rotor for rotating the magnetic recording medium and having a magnet provided on the outside periphery of said rotor;
   the stator is disposed surrounding said spindle motor, and including means defining a recess adapted to receive the carriage when the carriage is moved close to stator; and a coil is provided on the inside periphery of the stator, and opposed to said magnet, said recess being devoid of a coil.

3. The mounting structure according to claim 1, wherein said electronic part includes at least a connector.

4. A disk unit comprising:
a motor for rotating a magnetic recording medium disposed on one side of the motor,
a motor substrate for mechanically supporting the motor, the substrate disposed on another side of said motor,
electronic parts for controlling said motor,
a connector for connecting a wire to the motor substrate,
said motor substrate including an extension portion extended beyond the magnetic recording medium;
said electronic parts being mounted on said extension portion; and
said motor substrate electrically interconnecting electronic parts and said motor.

5. The electronic parts and connector mounting structure according to claim 4, wherein
said motor is a spindle motor including a rotor for rotating the magnetic recording medium and having a magnet provided on the outside periphery of said rotor;
a ring-shaped stator surrounding said spindle motor, and including means defining a recess adapted to receive the carriage when the carriage is moved close to the stator; and
a coil provided on the inside periphery of the stator, and opposed to said magnet, said recess being devoid of a coil.

6. A disk unit comprising:
a substrate;
a motor for rotating a magnetic recording medium disposed to one side of the substrate, the motor disposed between the substrate and the magnetic recording medium;
electronic parts for operating the disk unit, including the motor;
the substrate including an extension portion extended beyond the magnetic recording medium, and the electronic parts being mounted on the extension portion thereof;
the substrate including a portion adjacent the motor; and
the substrate electrically interconnecting the motor and the electronic parts.

* * * * *